Patented July 8, 1930

1,770,001

UNITED STATES PATENT OFFICE

HENRY ATHERTON LEE, OF HONOLULU, TERRITORY OF HAWAII

FUNGICIDE

No Drawing.   Application filed January 22, 1927. Serial No. 162,940.

This invention relates to fungicides and more particularly to that type employing a sulphur base.

Many substances have heretofore been proposed for use as fungicides and insecticides. Of these perhaps the three more important groups are those which use a copper, mercury or sulphur body. Mercury disinfectants or fungicides present the disadvantage of relatively high cost; in addition to this, these compounds are poisonous and hence subject the operator to possible poisoning. Copper and sulphur compounds used for this purpose have not been particularly efficacious because it has been found that their use has insured only a slight degree of control of plant diseases. Of these two, the sulphur compounds appear to be the best plant disinfectants to date.

At the present time both dust fungicides and liquid fungicides are being used. The former appear to have a wider use, due in a large measure to their greater economy. It is, however, generally conceded that the liquid spray is the most effective for preventing plant diseases.

It is an object of my invention to render dust fungicides more efficacious.

It is a further object of my invention to improve sulphur fungicides with no appreciable cost increase.

It appears to be doubtful that sulphur as such possesses any great utility as an insecticide or fungicide. Its effectiveness for this purpose seems to depend on the fact that from it certain oxidation products are formed. It is now generally accepted that the fungicidal properties of sulphur are due to the formation of polythionic acids. Furthermore it is quite well established that the pentathionic acid is an active fungicidal agent.

It has been the practice heretofore to grind sulphur to a suitable degree of fineness and to spray it as a dust or suspended in a liquid carrier on the infected plants. In the presence of sunlight the sulphur is oxidized and polythionic acids are formed. This oxidation is slow and necessarily dependent to a large degree on climatic factors and especially to solar conditions.

I propose to so treat the sulphur that its effectiveness as a fungicide will be more quickly initiated and will be less dependent on the variable factors mentioned. I accomplish this by incorporating with the sulphur an active oxidizing agent. This treatment insures a more rapid oxidation of the sulphur and hence an early and complete formation of the pentathionic acid. In both laboratory and field experiments I find that much better results are obtained with sulphur treated with an oxidizing agent than with sulphur which is subjected only to atmospheric oxidation. In field work, on sugar cane for example, the number of infections per leaf was greatly reduced when treated with sulphur having incorporated in it an oxidizing agent. The use of this modified form of sulphur resulted in a greater degree of control than could be obtained by the use of the ordinary powdered sulphur.

I have found that both liquid and solid oxidizing agents may be used. Thus I have used a dust which consisted of one percent of powdered potassium permanganate thoroughly incorported in ninety-nine per cent of powdered sulphur. This mixture is easily made, it being only necessary to powder the permanganate crystals and to mix these with the sulphur.

I have also found that a very effective fungicidal mixture can be prepared by using one-fourth of one per cent of nitric acid with powdered sulphur. In this case the nitric acid is atomized on the sulphur and the mass thoroughly mixed. For preparing this product any suitable nebulizer and mixer may be used.

To obtain the best results, the sulphur used should be very finely divided. I have experimented with flowers of sulphur and obtained pleasing results. I find, however, that a better effect can be obtained by using sulphur which will pass a two hundred to a three hundred mesh screen.

While a sulphur dust, for the reasons stated, is more economical than a liquid spray, it is to be understood that my invention is not limited to this particular form. After incorporating the oxidizing agent I may suspend the resulting powder in a neutral liquid carrier and apply it to the plants in this form. It will be appreciated also that I may at the one time incorporate several oxidizing agents with the sulphur.

It is to be understood that the examples given are not exhaustive. I have described active solid and liquid oxidizing agents to typify how agents of this class may be incorporated with the sulphur. It is obvious that other fluid and solid agents may be used; it is preferable, however, to use agents of considerable activity such as those mentioned.

I claim:

1. A fungicidal, insecticidal and disinfecting product comprising sulphur having incorporated therein an oxidizing agent forming directly polythionic acids in the presence of atmospheric moisture.

2. A fungicide comprising finely divided sulphur and an incorporated oxidizing agent forming directly polythionic acids in the presence of atmospheric moisture.

3. A potentially reactive fungicidal mixture comprising finely divided sulphur and a small amount of an oxidizing agent to accelerate the formation of polythionic acids.

4. A composition having potential fungicidal and insecticidal properties comprising sulphur and potassium permanganate to accelerate the formation of polythionic acids.

5. A fungicidal and insecticidal composition comprising finely divided sulphur and a sufficient amount of potassium permanganate to initiate the formation of polythionic acids.

6. A fungicidal and insecticidal composition comprising finely divided sulphur and a finely divided oxidizing agent sufficient to form directly polythionic acids in the presence of atmospheric moisture.

7. A fungicidal and insecticidal composition comprising approximately 99% finely divided sulphur and approximately 1% of an oxidizing agent.

In testimony whereof I affix my signature.

HENRY ATHERTON LEE.